United States Patent
Padiyath et al.

(10) Patent No.: US 7,632,568 B2
(45) Date of Patent: Dec. 15, 2009

(54) SOLAR CONTROL MULTILAYER FILM

(75) Inventors: Raghunath Padiyath, Woodbury, MN (US); Charles A. Marttila, Shoreview, MN (US); Cristina U. Thomas, Stillwater, MN (US); Michael F. Weber, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 418 days.

(21) Appl. No.: 11/313,518

(22) Filed: Dec. 21, 2005

(65) Prior Publication Data

US 2006/0154049 A1    Jul. 13, 2006

Related U.S. Application Data

(60) Provisional application No. 60/642,316, filed on Jan. 7, 2005.

(51) Int. Cl.
B32B 5/16    (2006.01)
(52) U.S. Cl. .................. 428/328; 428/336; 428/522
(58) Field of Classification Search .................. None
See application file for complete search history.

(56) References Cited

U.S. PATENT DOCUMENTS

| | | | |
|---|---|---|---|
| 3,610,724 A | 10/1971 | Frizzell | |
| 3,711,176 A | 1/1973 | Alfrey, Jr. et al. | |
| 3,801,429 A | 4/1974 | Schrenk et al. | |
| 4,446,305 A | 5/1984 | Rogers et al. | |
| 4,540,623 A | 9/1985 | Im et al. | |
| 5,094,788 A | 3/1992 | Schrenk et al. | |
| 5,094,793 A | 3/1992 | Schrenk et al. | |
| 5,360,659 A * | 11/1994 | Arends et al. | 428/216 |
| 5,448,404 A | 9/1995 | Schrenk et al. | |
| 5,807,511 A | 9/1998 | Kunimatsu | |
| 5,882,774 A | 3/1999 | Jonza et al. | |
| 6,045,894 A | 4/2000 | Jonza et al. | |
| 6,174,360 B1 | 1/2001 | Sliwinski et al. | |
| 6,352,761 B1 | 3/2002 | Hebrink et al. | |
| 6,355,754 B1 | 3/2002 | Olson et al. | |
| 6,454,848 B2 | 9/2002 | Sliwinski et al. | |
| 6,531,230 B1 | 3/2003 | Weber et al. | |
| 6,827,886 B2 | 12/2004 | Neavin et al. | |
| 2001/0022982 A1 | 9/2001 | Neavin et al. | |
| 2002/0090507 A1 | 7/2002 | Barth et al. | |
| 2003/0054160 A1 | 3/2003 | Fisher et al. | |
| 2004/0085642 A1 | 5/2004 | Condo et al. | |

FOREIGN PATENT DOCUMENTS

| | | |
|---|---|---|
| WO | WO 99/39224 | 8/1999 |
| WO | WO 02/41041 | 5/2002 |
| WO | WO 2006/074168 | 7/2006 |

\* cited by examiner

*Primary Examiner*—Monique R Jackson
(74) *Attorney, Agent, or Firm*—Jeffrey M. Olofson

(57) ABSTRACT

A multilayer film article is disclosed. The multilayer film article includes an infrared light reflecting multilayer film having alternating layers of a first polymer type and a second polymer type, an infrared light absorbing nanoparticle layer including a plurality of metal oxide nanoparticles dispersed in a cured polymeric binder and having a thickness in a range from 1 to 20 micrometers. The nanoparticle layer being disposed adjacent the multilayer film. The metal oxide nanoparticles include tin oxide or doped tin oxide.

23 Claims, 6 Drawing Sheets

SOLAR CONTROL MULTILAYER FILM

CROSS-REFERENCE

This application claims the benefit, under 35 U.S.C.§119 (e) of Provisional Application Ser. No. 60/642,316, filed on Jan. 7, 2005, and is incorporated by reference herein.

BACKGROUND

The present invention generally relates to solar control multilayer film. The present invention more particularly relates to solar control multilayer film that includes infrared absorbing nanoparticles.

Dyed and vacuum-coated plastic films have been applied to windows to reduce heat load due to sunlight. To reduce heat load, solar transmission is blocked in either the visible or the infrared portions of the solar spectrum (i.e., at wavelengths ranging from 400 nm to 2500 nm or greater.)

Primarily through absorption, dyed films can control the transmission of visible light and consequently provides glare reduction. However, dyed films generally do not block near-infrared solar energy and consequently are not completely effective as solar control films. Dyed films also often fade with solar exposure. In addition, when films are colored with multiple dyes, the dyes often fade at different rates, causing an unwanted color changes over the life of the film.

Other known window films are fabricated using vacuum-deposited grey metals, such as stainless steel, inconel, monel, chrome, or nichrome alloys. The deposited grey metal films offer about the same degrees of transmission in the visible and infrared portions of the solar spectrum. As a result, the grey metal films are an improvement over dyed films with regard to solar control. The grey metal films are relatively stable when exposed to light, oxygen, and/or moisture, and in those cases in which the transmission of the coatings increases due to oxidation, color changes are generally not detectable. After application to clear glass, grey metals block light transmission by approximately equal amounts of solar reflection and absorption.

Vacuum-deposited layers such as silver, aluminum, and copper control solar radiation primarily by reflection and are useful only in a limited number of applications due to the high level of visible reflectance. A modest degree of selectivity (i.e., higher visible transmission than infrared transmission) is afforded by certain reflective materials, such as copper and silver.

There is a need for improved solar control film that has a high visible light transmission and substantially blocks infrared radiation.

SUMMARY

Generally, the present invention relates to solar control multilayer film. The present invention more particularly relates to solar control multilayer film that includes infrared absorbing nanoparticles.

In one embodiment, a multilayer film article is disclosed. The multilayer film article includes an infrared light reflecting multilayer film having alternating layers of a first polymer type and a second polymer type, an infrared light absorbing nanoparticle layer including a plurality of metal oxide nanoparticles dispersed in a cured polymeric binder and having a thickness in a range from 1 to 20 micrometers. The nanoparticle layer being disposed adjacent the multilayer film. The metal oxide nanoparticles include tin oxide or doped tin oxide.

In a further embodiment, a light control article for blocking infrared light from an infrared light source includes an infrared light reflecting multilayer film having alternating layers of a first polymer type and a second polymer type, and an infrared light absorbing nanoparticle layer adjacent the multilayer film. The infrared light absorbing nanoparticle layer includes a plurality of metal oxide nanoparticles dispersed in a cured polymeric binder. The metal oxide includes tin oxide or doped tin oxide and the infrared light absorbing nanoparticle layer has a thickness in a range from 1 to 20 micrometers. The infrared light reflecting multilayer film is disposed between an infrared light source and the infrared light absorbing nanoparticle layer. A glass substrate is disposed adjacent either the infrared light absorbing nanoparticle layer or the infrared light reflecting multilayer film.

In another embodiment, a multilayer film article includes an infrared light reflecting multilayer film having alternating layers of a first polymer type and a second polymer type and an infrared light absorbing nanoparticle layer having a plurality of metal oxide nanoparticles dispersed in a cured polymeric binder. The nanoparticle layer is disposed adjacent the multilayer film and has a thickness in a range from 1 to 20 micrometers. The multilayer film having an average visible light transmission of at least 45% and an average infrared transmission for 780 nm to 2500 nm light of less than 15%.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

The present application may be more completely understood in consideration of the following detailed description of various embodiments of the invention in connection with the accompanying drawings, in which.

Figure 1A:
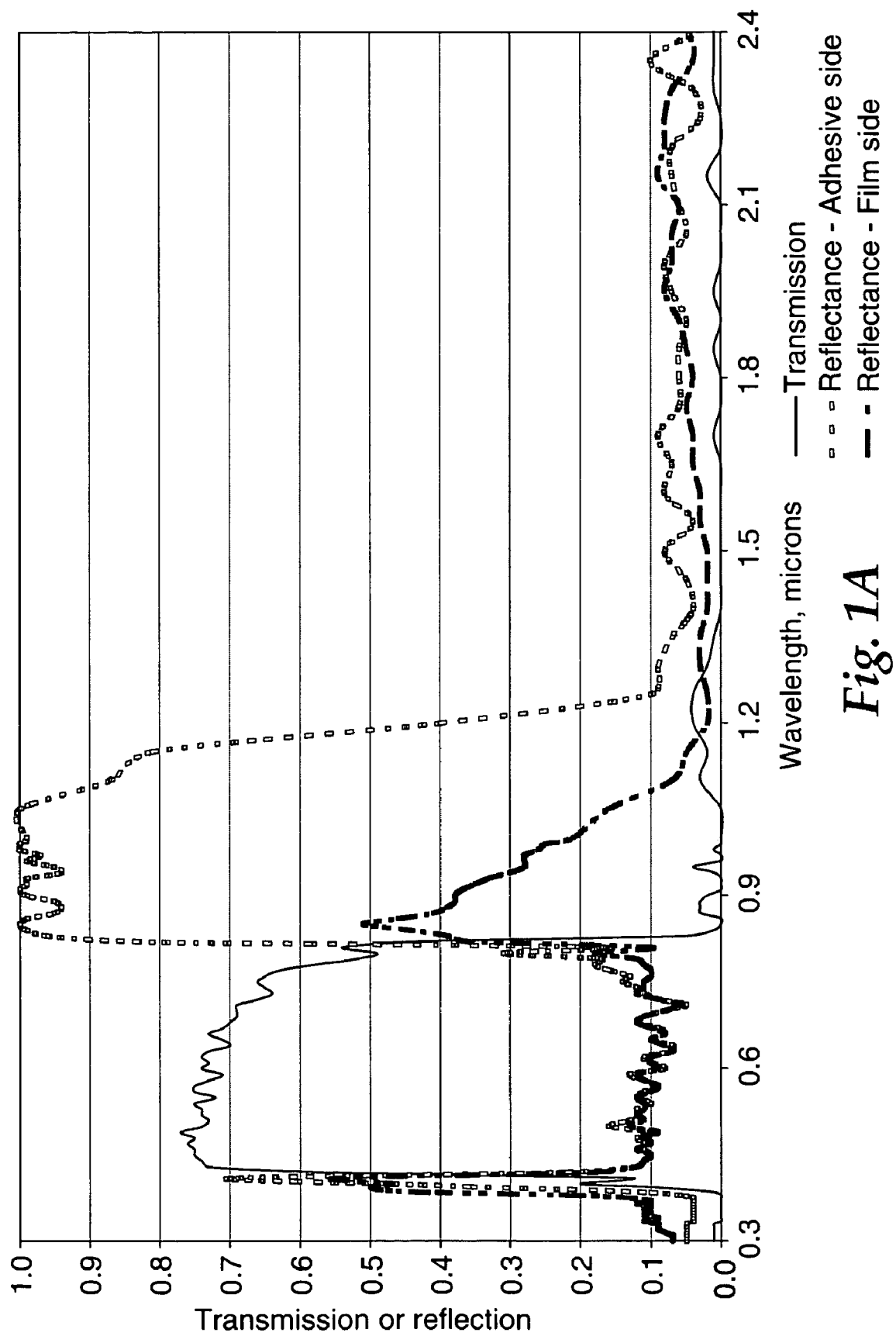
FIG. 1A is an optical transmission and reflection spectra of film prepared according to Example 1 with the adhesive side towards the light source.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The solar control multilayer film of the present invention is believed to be applicable to a variety of applications needing solar control including, for example, architectural and transportation applications. In some embodiments, the solar control multilayer film article includes an infrared absorbing nanoparticle layer disposed on an infrared reflecting multilayer film. In other embodiments, the solar control multilayer film article includes an infrared reflecting multilayer film disposed between an infrared absorbing nanoparticle layer and an adhesive layer. The solar control film can be adhered to an optical substrate such as, for example, a glass substrate. These examples, and the examples discussed below, provide an appreciation of the applicability of the disclosed solar control multilayer film, but should not be interpreted in a limiting sense.

The term "polymer" or "polymeric" will be understood to include polymers, copolymers (e.g., polymers formed using two or more different monomers), oligomers and combinations thereof, as well as polymers, oligomers, or copolymers. Both block and random copolymers are included, unless indicated otherwise.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

Weight percent, wt %, percent by weight, % by weight, and the like are synonyms that refer to the concentration of a substance as the weight of that substance divided by the weight of the composition and multiplied by 100.

The term "adjacent" refers to one element being in close proximity to another element and includes the elements touching one another and further includes the elements being separated by one or more layers disposed between the elements.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", an and "the" include plural referents unless the content clearly dictates otherwise. Thus, for example, reference to a composition containing "a nanoparticle layer" includes two or more nanoparticle layers. As used in this specification and the appended claims, the term "or" is generally employed in its sense including "and/or" unless the content clearly dictates otherwise.

This disclosure generally describes multilayer film that includes an infrared absorbing nanoparticle layer disposed on polymeric multilayer film. In many embodiments, an infrared light reflecting multilayer film has alternating layers of a first polymer type and a second polymer type, and an infrared light absorbing nanoparticle layer is adjacent the multilayer film. The nanoparticle layer includes a plurality of metal oxide nanoparticles. In some embodiments, the multilayer film is disposed adjacent to an optical substrate such as glass to form a solar control article. In some embodiments, the multilayer film has an average visible light transmission of at least 45% and an average infrared transmission for 780 nm to 2500 nm light of less than 15%.

FIGS. 1A-1C, 2 and 3 are optical transmission and reflection spectra of films prepared according to Examples 1-3.

Figure 4:
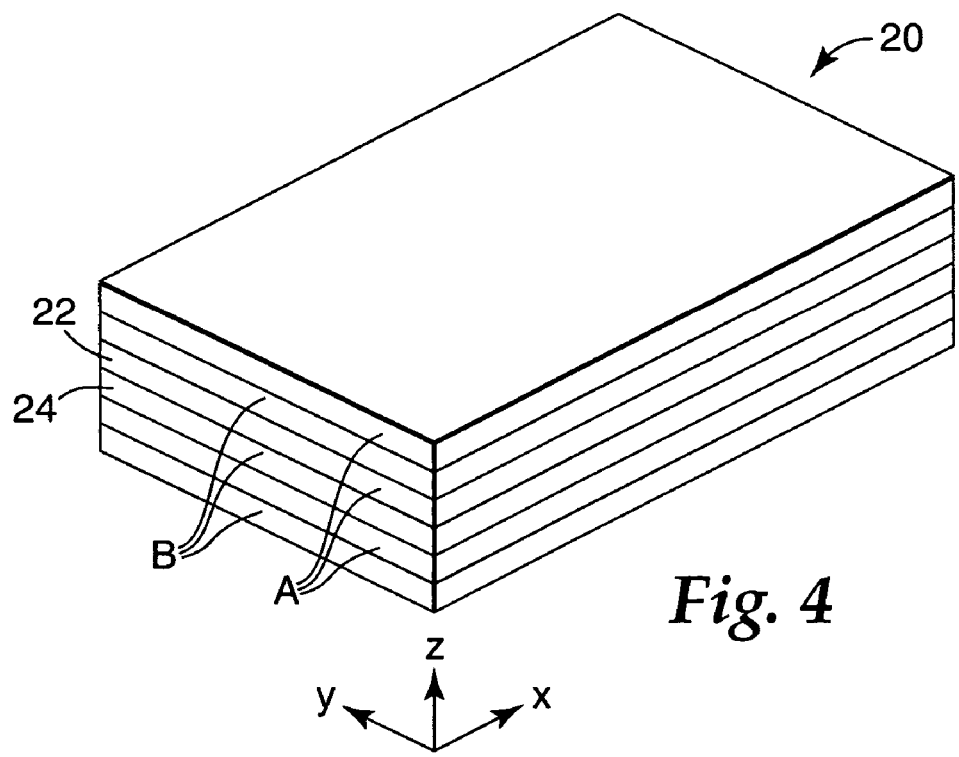
FIG. 4 is a perspective view of a multilayer film.

FIG. 4 illustrates multilayer optical film 20. The film includes individual layers 22, 24. The layers have different refractive index characteristics so that some light is reflected at interfaces between adjacent layers. The layers are sufficiently thin so that light reflected at a plurality of the interfaces undergoes constructive or destructive interference in order to give the film the desired reflective or transmissive properties. For optical films designed to reflect light at ultraviolet, visible, or near-infrared wavelengths, each layer generally has an optical thickness (i.e., a physical thickness multiplied by refractive index) of less than about 1 micrometer. Thicker layers can, however, also be included, such as skin layers at the outer surfaces of the film, or protective boundary layers disposed within the film that separate packets of layers.

The reflective and transmissive properties of multilayer optical film 20 are a function of the refractive indices of the respective layers (i.e., microlayers). Each layer can be characterized at least in localized positions in the film by in-plane refractive indices $n_x$, $n_y$, and a refractive index $n_z$ associated with a thickness axis of the film. These indices represent the refractive index of the subject material for light polarized along mutually orthogonal x-, y- and z-axes, respectively (see FIG. 4). In practice, the refractive indices are controlled by judicious materials selection and processing conditions. Film 20 can be made by co-extrusion of typically tens or hundreds of layers of two alternating polymers A, B, followed by optionally passing the multilayer extrudate through one or more multiplication dies, and then stretching or otherwise orienting the extrudate to form a final film. The resulting film is composed of typically tens or hundreds of individual layers whose thicknesses and refractive indices are tailored to provide one or more reflection bands in desired region(s) of the spectrum, such as in the visible, near infrared, and/or infrared. In order to achieve high reflectivities with a reasonable number of layers, adjacent layers preferably exhibit a difference in refractive index ($\Delta n_x$) for light polarized along the x-axis of at least 0.05. In some embodiments, if the high reflectivity is desired for two orthogonal polarizations, then the adjacent layers also exhibit a difference in refractive index ($\Delta n_y$) for light polarized along the y-axis of at least 0.05. In other embodiments, the refractive index difference $\Delta n_y$ can be less than 0.05 or 0 to produce a multilayer stack that reflects normally incident light of one polarization state and transmits normally incident light of an orthogonal polarization state.

If desired, the refractive index difference ($\Delta n_z$) between adjacent layers for light polarized along the z-axis can also be tailored to achieve desirable reflectivity properties for the p-polarization component of obliquely incident light. For ease of explanation, at any point of interest on a multilayer optical film the x-axis will be considered to be oriented within the plane of the film such that the magnitude of $\Delta n_x$ is a maximum. Hence, the magnitude of $\Delta n_y$ can be equal to or less than (but not greater than) the magnitude of $\Delta n_x$. Furthermore, the selection of which material layer to begin with in calculating the differences $\Delta n_x$, $\Delta n_y$, $\Delta n_z$ is dictated by requiring that $\Delta n_x$ be non-negative. In other words, the refractive index differences between two layers forming an interface are $\Delta n_j = n_{1j} - n_{2j}$, where j=x, y, or z and where the layer designations 1, 2 are chosen so that $n_{1x} \geq n_{2x}$, i.e., $\Delta n_x \geq 0$.

To maintain high reflectivity of p-polarized light at oblique angles of incidence, the z-index mismatch $\Delta n_z$ between layers can be controlled to be substantially less than the maximum in-plane refractive index difference $\Delta n_x$, such that $\Delta n_z \leq 0.5 * \Delta n_x$. More preferably, $\Delta n_z \leq 0.25 * \Delta n_x$. A zero or near zero magnitude z-index mismatch yields interfaces between layers whose reflectivity for p-polarized light is constant or near constant as a function of incidence angle. Furthermore, the z-index mismatch $\Delta n_z$ can be controlled to have the opposite polarity compared to the in-plane index difference $\Delta n_x$, i.e. $\Delta n_z < 0$. This condition yields interfaces whose reflectivity for p-polarized light increases with increasing angles of incidence, as is the case for s-polarized light.

Multilayer optical films have been described in, for example, U.S. Pat. No. 3,610,724 (Rogers); U.S. Pat. No. 3,711,176 (Alfrey, Jr. et al.), "Highly Reflective Thermoplastic Optical Bodies For Infrared, Visible or Ultraviolet Light"; U.S. Pat. No. 4,446,305 (Rogers et al.); U.S. Pat. No. 4,540,623 (Im et al.); U.S. Pat. No. 5,448,404 (Schrenk et al.); U.S. Pat. No. 5,882,774 (Jonza et al.) "Optical Film"; U.S. Pat. No. 6,045,894 (Jonza et al.) "Clear to Colored Security Film"; U.S. Pat. No. 6,531,230 (Weber et al.) "Color Shifting Film"; PCT Publication WO 99/39224 (Ouderkirk et al.) "Infrared Interference Filter"; and US Patent Publication 2001/0022982 A1 (Neavin et al.), "Apparatus For Making Multilayer Optical Films", all of which are incorporated herein by reference. In such polymeric multilayer optical films, polymer materials are used predominantly or exclusively in the makeup of the individual layers. Such films can be compatible with high volume manufacturing processes, and may be made in large sheets and roll goods.

The multilayer film can be formed by any useful combination of alternating polymer type layers. In many embodiments, at least one of the alternating polymer layers is birefringent and oriented. In some embodiments, one of the alternating polymer layer is birefringent and orientated and the other alternating polymer layer is isotropic. In one embodiment, the multilayer optical film is formed by alternating layers of a first polymer type including polyethylene terephthalate (PET) or copolymer of polyethylene terephthalate (coPET) and a second polymer type including poly(methyl methacrylate) (PMMA) or a copolymer of poly(methyl methacrylate) (coPMMA). In another embodiment, the multilayer optical film is formed by alternating layers of a first polymer type including polyethylene terephthalate and a second polymer type including a copolymer of poly(methyl methacrylate and ethyl acrylate). In another embodiment, the multilayer optical film is formed by alternating layers of a first polymer type including cyclohexanedimethanol (PETG) or a copolymer of cyclohexanedimethanol (coPETG) and second polymer type including polyethylene naphthalate (PEN) or a copolymer of polyethylene naphthalate (coPEN). In another embodiment, the multilayer optical film is formed by alternating layers of a first polymer type including polyethylene naphthalate or a copolymer of polyethylene naphthalate and a second polymer type including poly(methyl methacrylate) or a copolymer of poly(methyl methacrylate). Useful combination of alternating polymer type layers are disclosed in U.S. Pat. No. 6,352,761, which is incorporated by reference herein.

Figure 5:
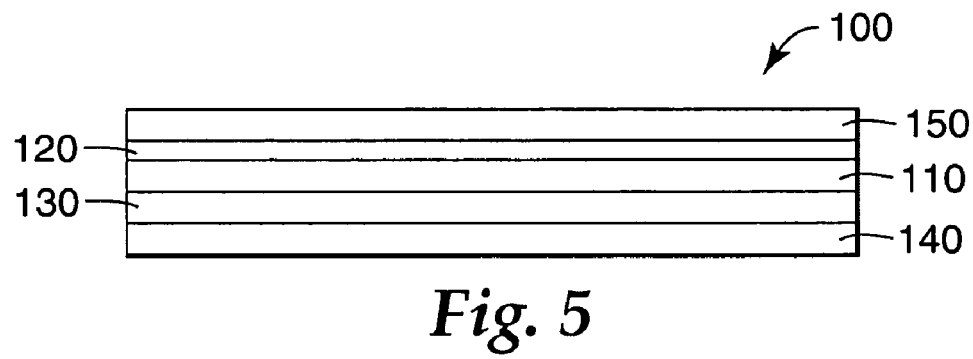
FIG. 5 schematically illustrates an embodiment of a solar control multilayer film article.

FIG. 5 schematically illustrates an embodiment of a solar control multilayer film article 100. The film 100 includes an infrared light reflecting multilayer film 110 having alternating layers of a first polymer type and a second polymer type, as described above. An infrared light absorbing nanoparticle layer 120 is disposed adjacent the multilayer film 110. A pressure sensitive layer 130 is disposed on the multilayer film 110. A release layer or optical substrate 140 is disposed on the pressure sensitive adhesive layer 130. An optional hardcoat layer 150 is disposed adjacent the multilayer film 110.

In many embodiments, the film 100 includes an infrared light reflecting multilayer film 110 having alternating layers of a first polymer type and a second polymer type, as described above and an infrared light absorbing nanoparticle layer 120 is disposed adjacent the multilayer film 110. In these embodiments, the infrared light absorbing nanoparticle layer 120 includes a metal oxide dispersed within a cured polymeric binder. In some embodiments, this infrared light absorbing nanoparticle layer 120 has a thickness in a range from 1 to 20 micrometers, or from 1 to 10 micrometers, or from 1 to 5 micrometers. A pressure sensitive layer 130 is disposed on the multilayer film 110. A release layer or optical substrate 140 is disposed on the pressure sensitive adhesive layer 130. In these embodiments, the infrared light absorbing nanoparticle layer 120 also functions as a hardcoat layer.

Figure 6:
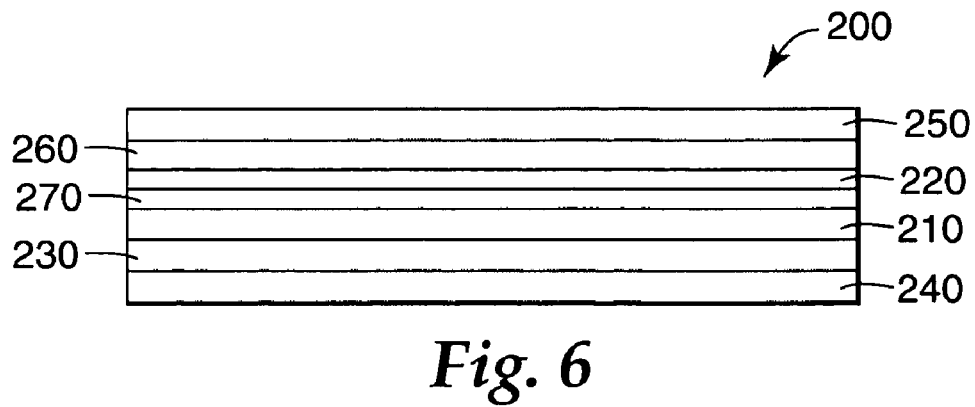
FIG. 6 schematically illustrates another embodiment of a solar control multilayer film article.

FIG. 6 schematically illustrates another embodiment of a solar control multilayer film article 200. The film 200 includes an infrared light reflecting multilayer film 210 having alternating layers of a first polymer type and a second polymer type, as described above. An infrared light absorbing nanoparticle layer 220 is disposed adjacent the multilayer film 210. An optional intermediate adhesive layer 270 is disposed between the nanoparticle layer 220 and the multilayer film 210. A pressure sensitive layer 230 is disposed on the multilayer film 210. A release layer or optical substrate 240 is disposed on the pressure sensitive adhesive layer 230. An optional hardcoat layer 250 is disposed adjacent the multilayer film 210. An optional intermediate polymeric layer 260 is disposed between the hardcoat layer 250 and the intermediate adhesive layer 270.

The above multilayer film article constructions provide improved solar control film articles. In some embodiments, the multilayer film has an average visible light transmission (400 to 780 nm) of at least 45% and an average infrared light transmission for 780 nm to 2500 nm light of less than 10% or less than 15%. In some embodiments, the multilayer film has an average visible light transmission of at least 60% and an infrared light transmission of 20% or less for substantially all wavelengths between 950 nm and 2500 nm. In some embodiments, the multilayer film article has an average light reflection between 780 and 1200 nm of 50% or greater and an average light transmission between 1400 and 2500 nm of 50% or less. In further embodiments, the multilayer film article has an average light reflection between 780 and 1200 nm of 80% or greater and an average light transmission between 1400 and 2500 nm of 20% or less. In still further embodiments, the multilayer film article has an average light reflection between 780 and 1200 nm of 90% or greater and an average light transmission between 1400 and 2500 nm of 5% or less.

The nanoparticle layer described above can include a plurality of metal oxide nanoparticles. A partial listing of metal oxide nanoparticles includes tin, antimony, indium and zinc oxides and doped oxides. In some embodiments, the metal oxide nanoparticles include, tin oxide, antimony oxide, indium oxide, indium doped tin oxide, antimony doped indium tin oxide, antimony tin oxide, antimony doped tin oxide or mixtures thereof. In some embodiments, the metal oxide nanoparticles include tin oxide or doped tin oxide and optionally further includes antimony oxide and/or indium oxide. The nanoparticles can have any useful size such as, for example, 1 to 100, or 30 to 100, or 30 to 75 nanometers. In some embodiments, the metal oxide nanoparticles include antimony tin oxide or doped antimony tin oxide dispersed in a polymeric material. The polymeric material can be any useful binder material such as, for example, polyolefin, polyacrylate, polyester, polycarbonate, fluoropolymer, and the like.

In many embodiments, the binder is a cured polymeric material that can function as a hardcoat. Suitable polymeric binders to form the infrared light absorbing nanoparticle layer include the thermal and/or U.V.-polymerized (i.e., cured) products of acrylate and/or methacrylate monomers. A suitable cured binder is the thermal and/or U.V.-polymerized product of a brominated, alkyl-substituted phenyl acrylate or methacrylate (e.g., 4,6-dibromo-2-sec-butyl phenyl acrylate), a methyl styrene monomer, a brominated epoxy diacrylate, 2-phenoxyethyl acrylate, and a hexa-functional aromatic urethane acrylate oligomer, as described in U.S. Pat. No. 6,355,754, incorporated herein by reference. While most types of energy polymerizable telechelic monomers and oligomers are useful for forming these polymeric binders, acrylates are preferred because of their high reactivity. The curable binder composition should be of flowable viscosity that is low enough that air bubbles do not become entrapped in the composition. Reactive diluents can be mono- or di-functional monomers such as, for example, SR-339, SR-256, SR-379, SR-395, SR-440, SR-506, CD-611, SR-212, SR-230, SR-238, and SR-247 available from Sartomer Co., Exton, Pa. Typical useful oligomers and oligomeric blends include CN-120, CN-104, CN-115, CN-116, CN-117, CN-118, CN-119, CN-970A60, CN-972, CN-973A80, CN-975 available from Sartomer Co., Exton, Pa. and Ebecryl 1608, 3200, 3201, 3302, 3605, 3700, 3701, 608, RDX-51027, 220, 9220, 4827, 4849, 6602, 6700-20T available from Surface Specialties, Smyrna, Ga. Additionally, a multi-functional crosslinker can assist in providing a durable, high crosslink density composite matrix. Examples of multi-functional monomers include SR-295, SR-444, SR-351, SR-399, SR-355, and SR-368 available from Sartomer Co., Exton, Pa. and PETA-K, PETIA and TMPTA-N available from Surface Specialties, Smyrna, Ga. Multi-functional monomers can be used as crosslinking agents to increase the glass transition temperature of the binder polymer that results from the polymerizing of the polymerizable composition.

In some embodiments, monomer compositions useful for forming the polymeric binder can have a melting point that is below about 50° C. The monomer composition can be a liquid at room temperature. Monomer compositions useful for forming the polymeric binder can be polymerized by conventional free radical polymerization methods. Examples of initiators include, organic peroxides, azo compounds, quinines, nitro compounds, acyl halides, hydrazones, mercapto compounds, pyrylium compounds, imidazoles, chlorotriazines, benzoin, benzoin alkyl ethers, di-ketones, phenones, and the like. Commercially available photoinitiators include, but not limited to, those available commercially from Ciba Geigy under the trade designations DARACUR 1173, DAROCUR 4265, IRGACURE 651, IRGACURE 1800, IRGACURE 369, IRGACURE 1700, and IRGACURE 907, IRGACURE 819. Phosphine oxide derivatives are preferred, such as LUCIRIN TPO, which is 2,4,6-trimethylbenzoy diphenyl phosphine oxide, available from BASF, Charlotte, N.C. A photoinitiator can be used at a concentration of about 0.1 to 10 weight percent or about 0.1 to 5 weight percent.

The polymerizable composition can form a hard resin or hardcoat. The term "hard resin" or "hardcoat" means that the resulting cured polymer exhibits an elongation at break of less than 50 or 40 or 30 or 20 or 10 or 5 percent when evaluated according to the ASTM D-882-91 procedure. In some embodiments, the hard resin polymer can exhibit a tensile modulus of greater than 100 kpsi ($6.89 \times 10^8$ pascals) when evaluated according to the ASTM D-882-91 procedure. In some embodiments, the hard resin polymer can exhibit a haze value of less than 10% or less than 5% when tested in a Taber abrader according to ASTM D 1044-99 under a load of 500 g and 50 cycles (haze can be measured with Haze-Gard Plus, BYK-Gardner, MD, haze meter.

In some embodiments, the metal oxide nanoparticles include indium tin oxide or doped indium tin oxide dispersed in a polymeric material. The nanoparticle layer can have any useful thickness such as, for example, from 1 to 10 or 2 to 8 micrometers. The nanoparticle layer can include nanoparticles at any useful loading or wt % such as, for example, 30 to 90 wt %, 40 to 80 wt %, or 50 to 80 wt %. In many embodiments, the nanoparticle layer is nonconducting. Nanoparticle compositions are commercially available from, for example, Advanced Nano Products Co., LTD., South Korea, under the tradenames TRB-PASTE™ SM6080(B), SH7080, SL6060. In another embodiment, the metal oxide nanoparticles include zinc oxide and/or aluminum oxide, such oxides are available from GfE Metalle und Materialien GmbH, Germany.

The pressure sensitive adhesive (PSA) layer described above can any type of adhesive that enables the solar control multilayer film to be affixed to the glass. In order to attach the solar control film to the glass, one surface of the solar control film is coated with the pressure-sensitive adhesive (PSA) and a release sheet is removed from the PSA before application of the film to the glass. Ultra-violet absorption additives can be incorporated into the PSA. In many embodiments, the PSA is an optically clear PSA film such as a polyacrylate pressure sensitive adhesive. The Pressure-Sensitive Tape Council has defined pressure sensitive adhesives as material with the following properties: (1) aggressive and permanent tack, (2) adherence with no more than finger pressure, (3) sufficient ability to hold onto an adherand, (4) sufficient cohesive strength, and (5) requires no activation by an energy source. PSAs are normally tacky at assembly temperatures, which is typically room temperature or greater (i.e., about 20° C. to about 30° C. or greater). Materials that have been found to function well as PSAs are polymers designed and formulated to exhibit the requisite viscoelastic properties resulting in a desired balance of tack, peel adhesion, and shear holding power at the assembly temperature. The most commonly used polymers for preparing PSAs are natural rubber-, synthetic rubber- (e.g., styrene/butadiene copolymers (SBR) and styrene/isoprene/styrene (SIS) block copolymers), silicone elastomer-, poly alpha-olefin-, and various (meth) acrylate- (e.g., acrylate and methacrylate) based polymers. Of these, (meth) acrylate-based polymer PSAs have evolved as a preferred class of PSA for the present invention due to their optical clarity, permanence of properties over time (aging stability), and versatility of adhesion levels, to name just a few of their benefits.

The release liner described above can be formed of any useful material such as, for example, polymers or paper and may include a release coat. Suitable materials for use in release coats include, but are not limited to, fluoropolymers, acrylics and silicones designed to facilitate the release of the release liner from the adhesive.

The optical substrate described above can be formed of any useful material. In some embodiments, the substrate is formed of a polymeric material such as, for example, cellulose triacetate, polycarbonate, polyacrylate, polypropylene, or polyethylene terephthalate. In other embodiments, the substrate is formed of an inorganic material such as, for example, quartz, glass, sapphire, YAG, or mica. The substrate can have any useful thickness. In one embodiment, the substrate is automotive or architectural glass. In some embodiments including clear glass substrates as a glazing system, the glazing system has a shading coefficient of 0.68 or less, or 0.6 or less, or 0.55 or less, or 0.50 or less, at a $T_{VIS}$ of 70% or greater.

In order to protect the solar control film for use on windows, the exposed surface of the multilayer film can optionally be coated with a scratch and wear resistant hardcoat. The hardcoat layer can improve the durability of the flexible substrate during processing and during use of the end product. The hardcoat layer can include any useful material, such as silica-based hardcoats, siloxane hardcoats, melamine hardcoats, acrylic hardcoats, and the like. The hardcoat can be any useful thickness such as, for example, from 1 to 20 micrometers, or 1 to 10 micrometers, or 1 to 5 micrometers. As described above, the infrared light absorbing layer can also function as a hardcoat layer, or an additional hardcoat layer can be disposed on the infrared light absorbing layer, as desired.

The intermediate adhesive described above can be formed of any useful material. In some embodiments, the intermediate adhesive layer includes a pressure sensitive adhesive material, as described above. In some embodiments, the intermediate adhesive layer includes a curable adhesive such as, for example a thermal or U.V. curable adhesive, as described above. The intermediate adhesive layer can have any useful thickness such as, for example, 1 to 100 micrometers, or 5 to 50 micrometers, or 10 to 50 micrometers, or 10 to 30 micrometers.

The intermediate polymeric layer described above can be formed of any useful material. In some embodiments, the intermediate layer includes a polyolefin, polyacrylate, polyester, polycarbonate, fluoropolymer, and the like. In one embodiment, the intermediate layer includes a polyethylene terephthalate. The intermediate polymeric layer can have any useful thickness such as, for example, 5 to 500 micrometers, or 10 to 100 micrometers, or 25 to 75 micrometers, or 25 to 50 micrometers.

In some embodiments, the solar control films described herein include an infrared light reflection pigment layer in addition to or replacing the infrared light absorbing nanoparticle layer. These infrared light reflection pigments can simply replace the infrared light absorbing nanoparticles in the layer, described above. In many embodiments, the infrared light reflecting pigment layer is disposed adjacent to the multilayer layer.

The infrared light reflecting pigment can include metal oxide. These infrared light reflection pigments can have any color, as desired. Useful infrared light reflection pigments are described in U.S. Pat. No. 6,174,360 and U.S. Pat. No. 6,454,848, and are incorporated by reference herein to the extent they do not conflict with the present disclosure. Infrared light reflecting pigments are commercially available from Kawamura Chemical Company, Japan, under the designations AB 820 (iron cobalt chromium black spinel CAS# 68186-97-0, pigment black 27), AE 801 and AG 235 (iron chromium oxide CAS# 12737-27-8, pigment brown 29).

EXAMPLES

Multilayer Film Preparation

A multilayer film containing about 446 layers was made on a sequential flat-film making line via a coextrusion process. This multilayer polymer film was made from coPEN and PETG (available from Eastman Chemicals). The coPEN was polymerized with 90% PEN and 10% PET starting monomers. A feedblock method (such as that described by U.S. Pat. No. 3,801,429) was used to generate about 223 optical layers with an approximately linear layer thickness gradient from layer to layer through the extrudate.

The coPEN was delivered to the feedblock by an extruder at a rate of about 132 lb/hr and the PETG at about 160 lb/hr. A portion of the PETG is used as protective boundary layers (PBL's) on each side of the extrudate with about 32 lb/hr flow total. The material stream then passed though an asymmetric two times multiplier with a multiplier design ratio of about 1.25. Multiplier concepts and function are described in U.S. Pat. Nos. 5,094,788 and 5,094,793. The multiplier ratio is defined as the average layer thickness of layers produced in the major conduit divided by the average layer thickness of layers in the minor conduit. This multiplier ratio was chosen so as to provide a small overlap of the two reflectance bands created by the two sets of 223 layers. Each set of 223 layers has the approximate layer thickness profile created by the feedblock, with overall thickness scale factors determined by the multiplier and film extrusion rates. After the multiplier, skin layers were added at about 72 lbs/hour (total) that was fed from a third extruder. Then the material stream passed through a film die and onto a water cooled casting wheel.

The PETG melt process equipment was maintained at about 500° F., the coPEN (both optics and skin layers) melt process equipment was maintained at about 525° F., and the feedblock, multiplier, skin-layer meltstream, and die were maintained at about 525° F. The feedblock used to make the film for this example was designed to give a linear layer thickness distribution with a 1.3:1 ratio of thickest to thinnest layers under isothermal conditions. Errors in this layer profile are corrected with the axial rod heater profile, as described in U.S. Pat. No. 6,827,886, which is incorporated by reference herein. The casting wheel speed was adjusted for precise control of final film thickness, and therefore, final bandedge position.

The inlet water temperature on the casting wheel was about 7° Celsius. A high voltage pinning system was used to pin the extrudate to the casting wheel. The pinning wire was about 0.17 mm thick and a voltage of about 6.5 kV was applied. The pinning wire was positioned manually by an operator about 3 to 5 mm from the web at the point of contact to the casting wheel to obtain a smooth appearance to the cast web. The cast web was continuously oriented by conventional sequential length orienter (LO) and tenter equipment. The web was length oriented to a draw ratio of about 3.8 at about 270° F. The film was preheated to about 255° F. in about 15 seconds in the tenter and drawn in the transverse direction to a draw ratio of about 3.5 at 270° F. The film was heat set in the tenter oven at a temperature of about 460° F. for about 30 seconds. The finished film had a final thickness of about 0.0035 inches.

Example 1

Figure 1B:
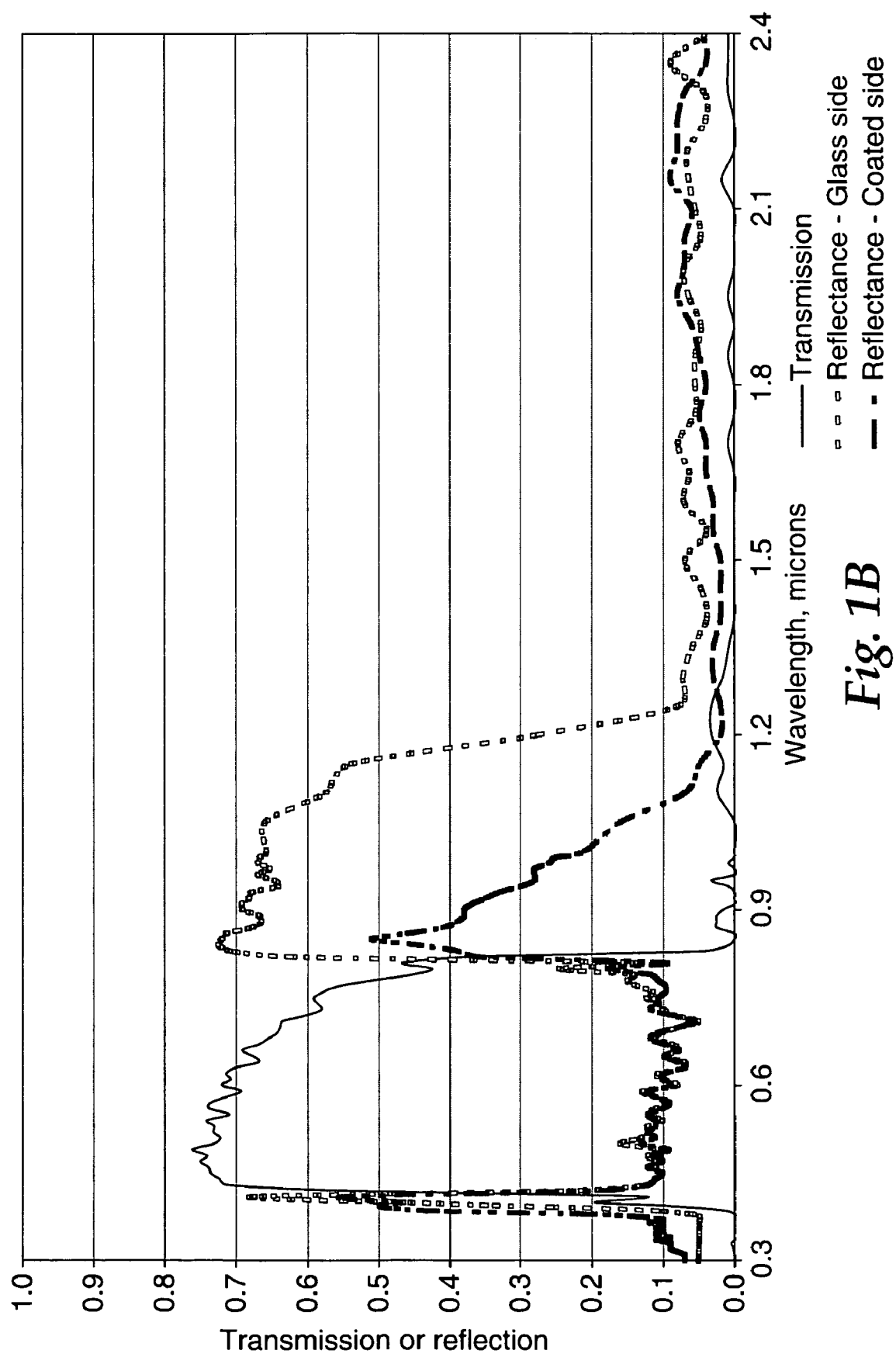
FIG. 1B is an optical transmission and reflection spectra of film prepared according to Example 1 laminated to a 3 mm clear glass with the adhesive side towards the sun.
Figure 1C:
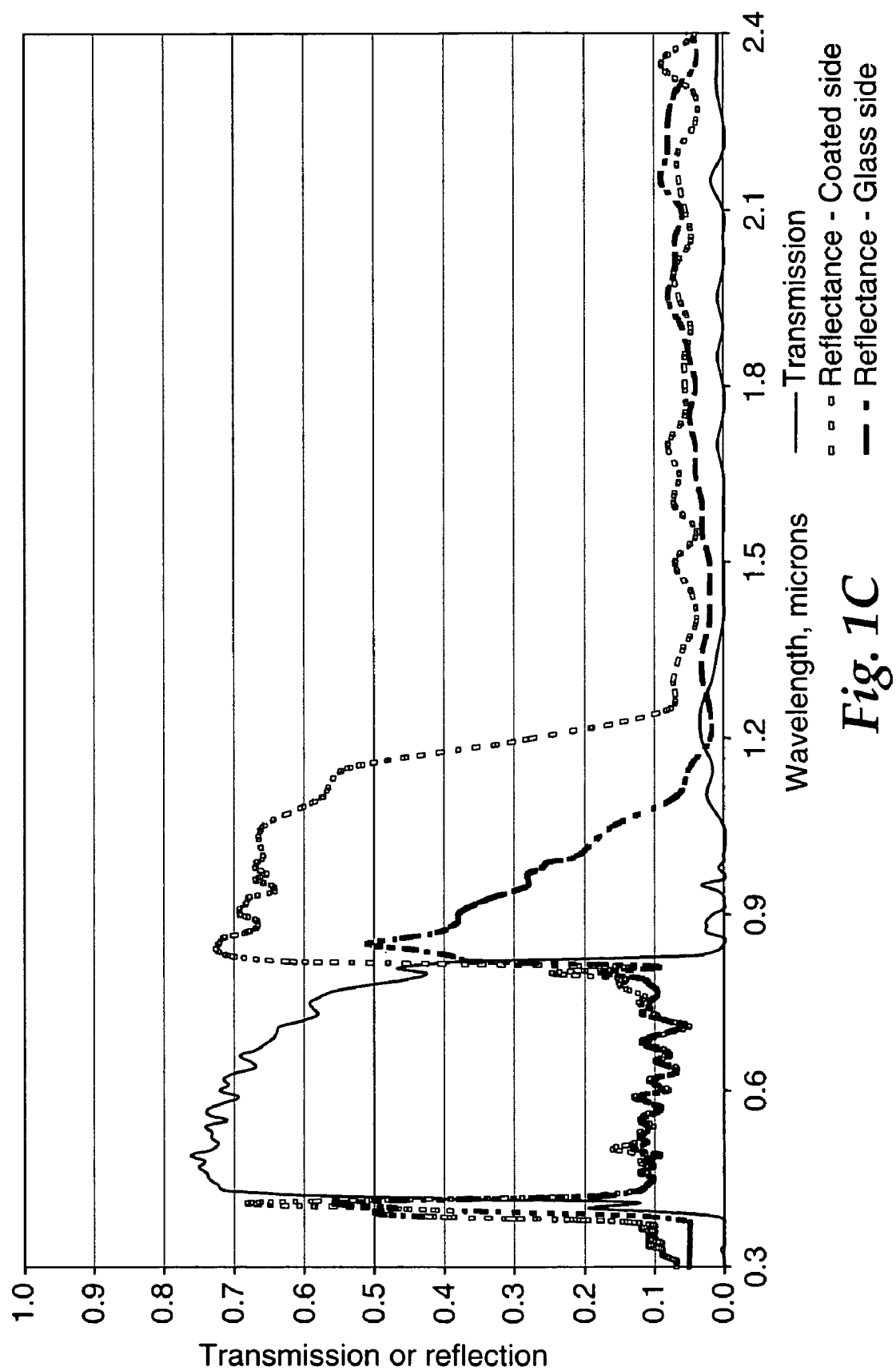
FIG. 1C is an optical transmission and reflection spectra of film prepared according to Example 1 laminated to a 3 mm clear glass with the adhesive side away from the sun.

An ultrafine dispersion of Antimony doped Indium Tin Oxide (A-ITO) particles in Methyl Cellosolve available from Advanced Nano Products Ltd., South Korea under the designation TRB Paste SM6080 was mixed with Methyl Ethyl Ketone to reduce the solid content in the dispersion from 60 to 45%. This solution was coated on the multilayer film described above using an extrusion die coating process. For a complete description of the die coating technique see "Modern Coating and Drying Technology," Eds. E. D. Cohen, E. B. Gutoff, VCH Publishers, NY, 1992). The extrudate flow rate was set at 330 g/min. (measured using a Micromotion™ flow meter, Micro Motion Inc., Boulder, Colo., USA), the web speed at 50 feet per minute and the coated width at 42 inches. The coating was dried to remove solvent from the dispersion at 93 degrees Celsius and cured using a Fusion UV lamp system fitted with type D lamp operating at 80% power setting. This process resulted in the cured coating having a coating weight of approx. 0.7 g/ft². The having dried and cured A-ITO was further with a pressure sensitive adhesive on the surface opposite to the A-ITO and a silicone coated release liner (available from CP Films, Martinsville, Va., USA) laminated to it. The release liner was removed and the optical transmission and reflection spectra measured using a Lambda 19 spectrophotometer (Perkin Elmer, Boston, Mass.). The spectra were imported into Optics5 and Window 5.2 programs available from Lawrence Berkeley National Laboratories for analyzing thermal and optical properties of glazing systems. The programs can be downloaded from http://windows.lbl.gov/software/. The reflection and transmission spectra of the coated film are shown in FIG. 1a. The characteristics of a glazing system prepared by laminating the above described film to a 3 mm clear glass (PPG clear glass, NFRC ID: 5009) with the adhesive side towards the light source (sun) is shown in Table 1. The transmission and reflection spectra after lamination to the 3 mm glass substrate are shown in FIGS. 1b and 1c. The same film was laminated with the A-ITO surface towards the sun and the glazing system recalculated using the same software. The results are shown in Table 1.

Example 2

Figure 2:
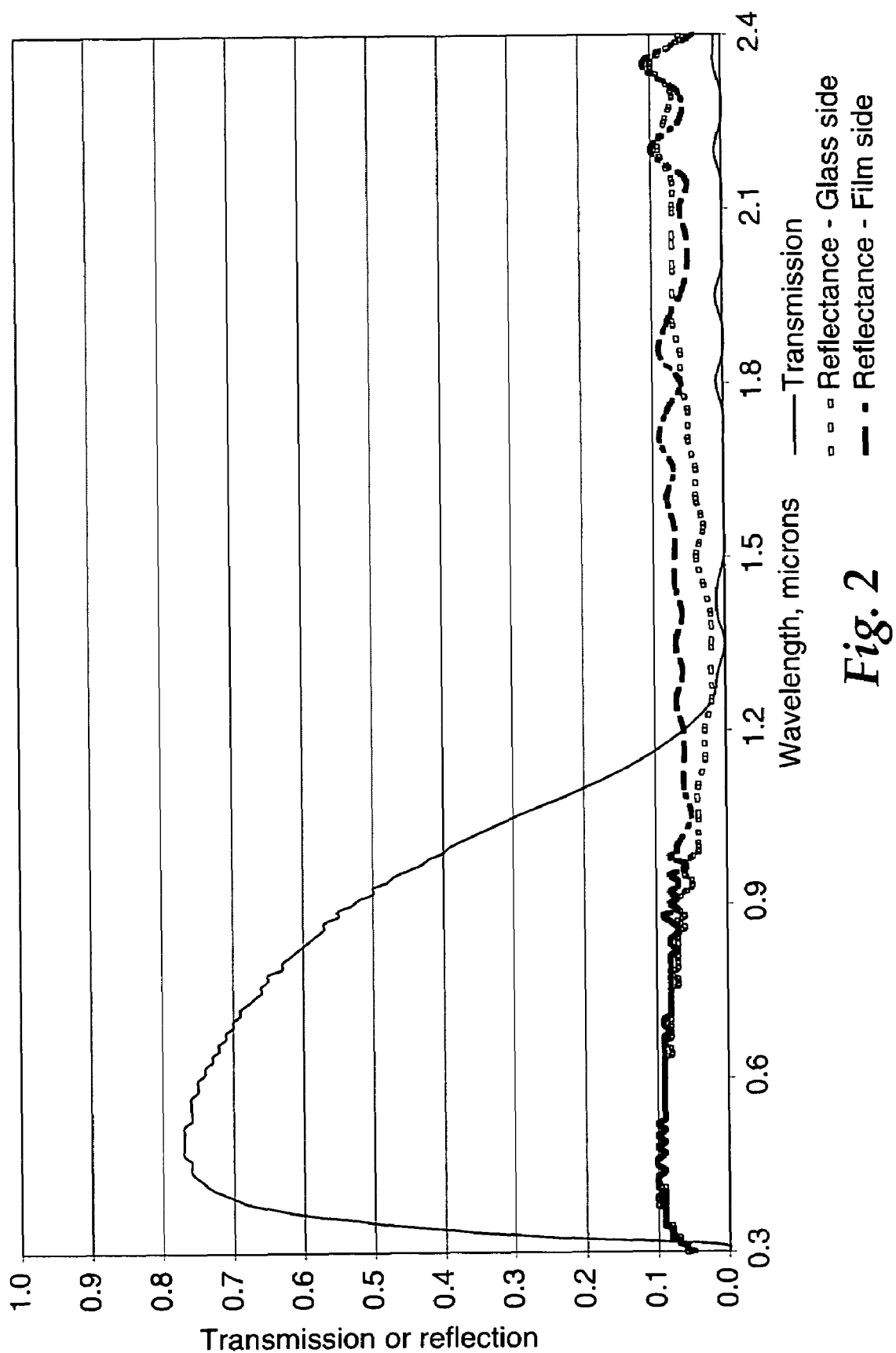
FIG. 2 is an optical transmission and reflection spectra of film prepared according to Example 2.

An ultrafine dispersion of Antimony doped Indium Tin Oxide(A-ITO) particles in Methyl Cellosolve available from under the designation TRB Paste SM6080 was obtained from Advanced Nano Products Ltd., South Korea. This solution was coated onto a 0.05 mm PET substrate available from Teijin Corp., Japan, under the trade designation HPE50 with a Yasui Seiki Lab Coater, Model CAG-150 (Yasui Seiki Co., Bloomington, Ind.) using a microgravure roll of 381 helical cells per lineal cm (150 helical cells per lineal inch). The coating was in-line dried at 95° C. and UV-cured at 6.1 m/min using a Fusion Systems Model 1600 (400 W/in) W curing system fitted with D-bulb. The dried coating had a thickness of approximately 3.6 micrometer. The optical transmission and reflection spectra of this film measured as done in example 1 are shown in FIG. 2. The glazing system prepared by laminating this film to a 6 mm PPG clear glass is shown in Table 1.

Example 3

Figure 3:
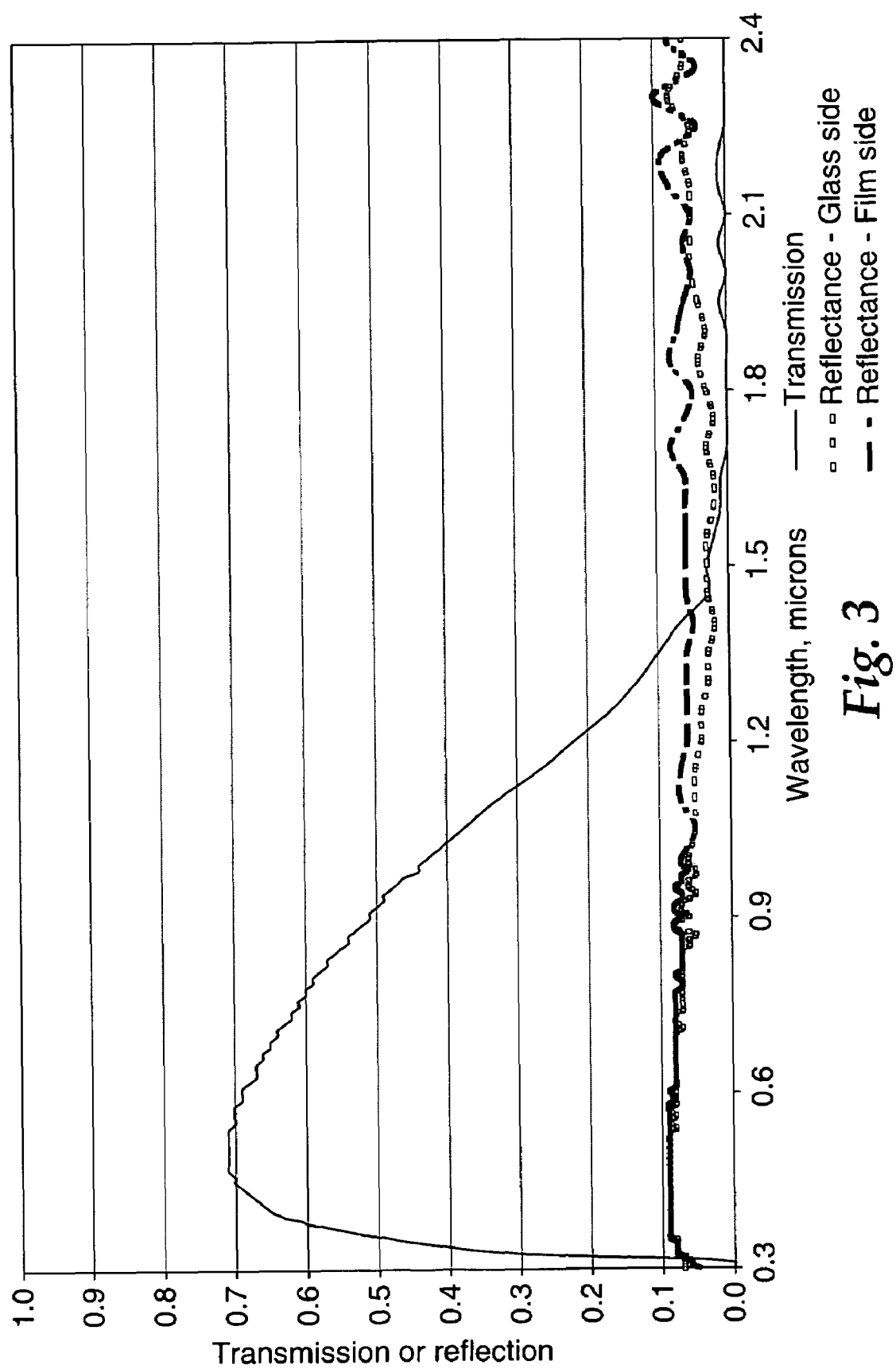
FIG. 3 is an optical transmission and reflection spectra of film prepared according to Example 3.

An ultrafine dispersion of Antimony doped Tin Oxide (ATO) particles in Methyl Cellosolve available from under the designation TRB Paste SL6060 was obtained from Advanced Nano Products Ltd., South Korea. This solution was coated onto a 0.05 mm PET substrate available from Teijin Corp., Japan, under the trade designation HPE50 with a Yasui Seiki Lab Coater, Model CAG-150 (Yasui Seiki Co., Bloomington, Ind.) using a microgravure roll of 381 helical cells per lineal cm (150 helical cells per lineal inch). The coating was in-line dried at 95° C. and UV-cured at 6.1 m/min using a Fusion Systems 6000 (600 W/in) W curing system fitted with D-bulb. The dried coating had a thickness of approximately 3.6 micrometer. The optical transmission and reflection spectra of this film measured as in example 1 are shown in FIG. 3. The glazing system prepared by laminating this film to a 6 mm PPG clear glass is shown in Table 1.

Example 4

The TRB paste SL6060 was coated on multilayer film, described above, using a meyer bar coating technique using Meyer bar #5(example 4a), #8 (example 4b) and #14 (example 4c.) The coatings were dried in an oven at 93° C. for 10 min and cured under Fusion UV lamps (300 W/in at 20 fpm) and optical transmission spectra of the samples measured. The spectra were imported into Optics5 and Window 5.2. The optical and thermal characteristics of glazing systems prepared with 3 mm clear glass are shown in Table 1.

TABLE 1

| Sample description | Tvis | Shading Coeff. | Rint | Rext |
|---|---|---|---|---|
| Example 1 with A-ITO coating away from sun | 72 | 0.54 | 11.1 | 10.8 |
| Example 1 with A-ITO coating away from sun | 72 | 0.59 | 10.8 | 11.1 |
| Example 2 | 73 | 0.68 | 9 | 9 |
| Example 3 | 74 | .73 | 9 | 9 |
| Example 4a | 72 | 0.57 | 13 | 13 |
| Example 4b | 63 | 0.51 | 12 | 10 |
| Example 4c | 55 | 0.47 | 12 | 9 |

Example 5

A dispersion of Antimony Tin Oxide (Inframat Advanced Materials LLC, CT product desgination 50N-5190-2) in a multi-functional acrylate monomer mixture was prepared by milling together 30 g. of ATO, 7.5 g. of penta aerithritol tetra acrylate (Sartomer Company, PA, product designation SR295 and 7.5 g. of 1,6-hexanedio diacrylate (Sartomer Company, PA, product designation SR238) and 1-methoxy-2-propanol. 0.15 g each of photoinitiators Irgacure 819 and Irgacure 184 (both from CIBA Specialty Chemicals, Basel, Switzerland) were added to the above dispersion and coated on the multilayer polymer film described above. The coating process was conducted as described in Example 1. The coating was cured and the resulting cured coating was tested in a Taber abrader according to ASTM D 1044-99 under a load of 500 g and 50 cycles. This resulted in a haze of less than 4% measured with Haze-Gard Plus (BYK-Gardner, Md.) haze meter.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

We claim:

1. A multilayer film article comprising:
   an infrared light reflecting multilayer film having alternating layers of a first polymer type and a second polymer type; and
   an infrared light absorbing nanoparticle layer comprising a plurality of metal oxide nanoparticles dispersed in a cured polymeric binder, the infrared light absorbing nanoparticle layer being adjacent the multilayer film and the metal oxide comprising tin oxide or doped tin oxide, the infrared light absorbing nanoparticle layer having a thickness in a range from 1 to 20 micrometers.

2. A multilayer film article according to claim 1 wherein the metal oxide nanoparticles comprises antimony tin oxide, doped antimony tin oxide, or indium doped tin oxide dispersed in a cured polyacrylate binder.

3. A multilayer film article according to claim 1 wherein the metal oxide nanoparticles further comprises antimony oxide or indium oxide dispersed in a cured polyacrylate binder.

4. A multilayer film article according to claim 1 wherein the infrared light absorbing nanoparticle layer has a thickness in a range from 1 to 10 micrometers.

5. A multilayer film article according to claim 1 wherein the nanoparticle layer comprises 50 to 80 wt % metal oxide nanoparticles.

6. A multilayer film article according to claim 1 wherein the first polymer type comprises polyethylene terephthalate or a copolymer of polyethylene terephthalate of and the second polymer type comprises poly(methyl methacrylate) or a copolymer of poly(methyl methacrylate).

7. A multilayer film article according to claim 1 wherein the first polymer type comprises cyclohexanedimethanol or a copolymer of cyclohexanedimethanol and the second polymer type comprises polyethylene naphthalate or a copolymer of polyethylene naphthalate.

8. A multilayer film article according to claim 1 further comprising a pressure sensitive adhesive layer disposed on the multilayer film, the multilayer film being disposed between the pressure sensitive adhesive layer and the infrared light absorbing nanoparticle layer.

9. A multilayer film article according to claim 8 further comprising a release liner dispose on the pressure sensitive adhesive layer, the pressure sensitive adhesive layer disposed between the release liner and the multilayer film.

10. A multilayer film article according to claim 1 further comprising an infrared light reflecting pigment layer disposed adjacent the multilayer film.

11. A light control article for blocking infrared light from an infrared light source comprising:
an infrared light reflecting multilayer film having alternating layers of a first polymer type and a second polymer type;
an infrared light absorbing nanoparticle layer comprising a plurality of metal oxide nanoparticles dispersed in a cured polymeric binder, the infrared light absorbing nanoparticle layer being adjacent the multilayer film and the metal oxide comprising tin oxide or doped tin oxide, the infrared light absorbing nanoparticle layer having a thickness in a range from 1 to 20 micrometers, wherein the infrared light reflecting multilayer film is disposed between an infrared light source and the infrared light absorbing nanoparticle layer; and
a glass substrate disposed adjacent either the infrared light absorbing nanoparticle layer or the infrared light reflecting multilayer film.

12. A light control article according to claim 11 wherein the wherein the first polymer type comprises polyethylene terephthalate or a copolymer of polyethylene terephthalate of and the second polymer type comprises poly(methyl methacrylate) or a copolymer of poly(methyl methacrylate).

13. A light control article according to claim 11 further comprising a pressure sensitive adhesive layer disposed between the infrared light reflecting multilayer film and the glass substrate.

14. A light control article according to claim 11 wherein the infrared light absorbing nanoparticle layer has a thickness in a range from 1 to 10 micrometers.

15. A light control article according to claim 11 further comprising an infrared light reflecting pigment layer disposed adjacent the multilayer film.

16. A multilayer film article comprising:
an infrared light reflecting multilayer film having alternating layers of a first polymer type and a second polymer type;
an infrared light absorbing nanoparticle layer comprising a plurality of metal oxide nanoparticles dispersed in a cured polymeric binder, the infrared light absorbing nanoparticle layer being adjacent the multilayer film and the metal oxide comprising tin oxide or doped tin oxide, the infrared light absorbing nanoparticle layer having a thickness in a range from 1 to 20 micrometers;
the multilayer film article having an average visible light transmission of at least 45% and an average infrared light transmission for 780 nm to 2500 nm light of less than 15%.

17. A multilayer film article according to claim 16 wherein the multilayer film article has an average visible light transmission of at least 60% and an infrared light transmission of 20% or less for substantially all wavelengths between 950 nm and 2500 nm.

18. A multilayer film article according to claim 16 wherein the multilayer film article has an average light reflection between 780 and 1200 nm of 50% or greater and an average light transmission between 1400 and 2500 nm of 50% or less.

19. A multilayer film article according to claim 16 wherein the multilayer film article has an average light reflection between 780 and 1200 nm of 80% or greater and an average light transmission between 1400 and 2500 nm of 20% or less.

20. A multilayer film article according to claim 16 wherein the multilayer film article has an average light reflection between 780 and 1200 nm of 90% or greater and an average light transmission between 1400 and 2500 nm of 500 or less.

21. A multilayer film article according to claim 16 further comprising a pressure sensitive adhesive layer disposed on the multilayer film, the multilayer film being disposed between the pressure sensitive adhesive layer and the nanoparticle layer.

22. A multilayer film article according to claim 16 wherein the infrared light absorbing nanoparticle layer has a thickness in a range from 1 to 10 micrometers.

23. A multilayer film article according to claim 16 further comprising an infrared light reflecting pigment layer disposed adjacent the multilayer film.

* * * * *

UNITED STATES PATENT AND TRADEMARK OFFICE
CERTIFICATE OF CORRECTION

PATENT NO.       : 7,632,568 B2
APPLICATION NO.  : 11/313518
DATED            : December 15, 2009
INVENTOR(S)      : Raghunath Padiyath It is certified that error appears in the above-identified patent and that said Letters Patent is hereby corrected as shown below:

Column 1

Line 6; delete "No." and insert -- No.: --, therefor.

Column 3

Line 51; delete "an" and insert -- "an", --, therefor.

Column 7

Line 53; delete "DARACUR" and insert -- DAROCUR --, therefor.

Column 7

Line 57; delete "6-trimethylbenzoy" and insert -- 6-trimethylbenzoyl --, therefor.

Column 8

Line 35; delete "adherand," and insert -- adherend, --, therefor.

Column 12

Line 32; delete "desgination" and insert -- designation --, therefor.

Column 12

Line 34; delete "aerithritol" and insert -- erythritol --, therefor.

Column 12

Line 36; delete "6-hexanedio" and insert -- 6-hexanediol --, therefor.

Column 13

Line 56; Claim 12, before "first" delete "wherein the".

Column 14

Line 44; Claim 20, delete "500" and insert -- 5% --, therefor.

Signed and Sealed this

Ninth Day of March, 2010

David J. Kappos
*Director of the United States Patent and Trademark Office*